Feb. 5, 1946.  G. J. BLUM  2,394,034
SAW BLADE HOLDER
Filed Nov. 4, 1943
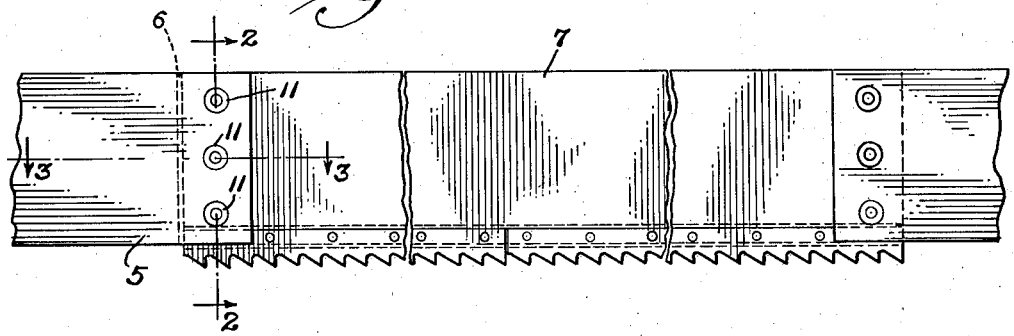
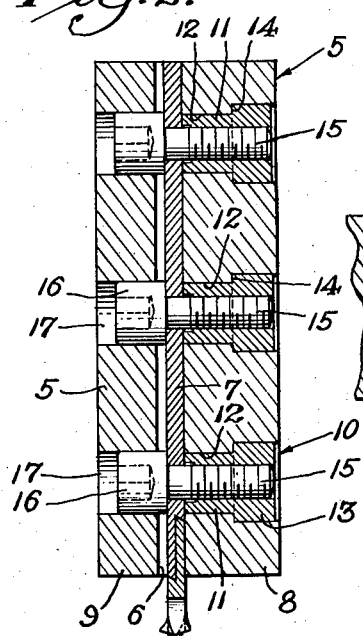
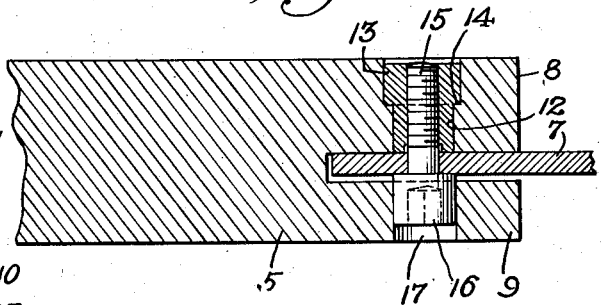
Inventor
George J. Blum
BY
Parker, Carlson, Pitzner & Hubbard
Attorneys.

Patented Feb. 5, 1946

2,394,034

UNITED STATES PATENT OFFICE 2,394,034

SAW BLADE HOLDER

George J. Blum, Chicago, Ill., assignor to Armstrong Blum Manufacturing Company, Chicago, Ill., a corporation of Illinois Application November 4, 1943, Serial No. 508,875

2 Claims. (Cl. 143—156)

The invention relates to improvements in saw blade holders and more particularly to holders of the type suitable for use in power hack saws.

One object of the invention is to provide a blade holder of the above general character embodying novel features of construction which materially improve its blade gripping ability and enable it to effectually hold saw blades of different thickness.

Another object is to provide a novel saw blade holder in which the parts subject to wear and use are constructed in the form of simple, inexpensive elements adapted for convenient replacement, thus substantially increasing the useful life of the main part of the holder.

Other objects and advantages of the invention will become apparent from the following detailed description of the preferred embodiment illustrated in the accompanying drawing in which:

Figure 1 is a side elevational view of a hack saw blade mounted in a pair of holders embodying the features of the invention.

Fig. 2 is a transverse sectional view of the holder and saw blade taken in a vertical plane substantially on the line 2—2 of Fig. 1.

Fig. 3 is a sectional view of the holder and saw blade taken in a horizontal plane substantially on the line 3—3 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The improved saw blade holder, in its preferred form, comprises a rigid body 5 herein shown as a metal bar of generally rectangular cross section adapted to be mounted on the frame of a power hack saw in the usual manner. In practice, two such holders are ordinarily mounted in the hack saw frame spaced apart to support the opposite ends of the saw blade.

At its inner end the holder body 5 is formed with a longitudinal slot 6 of sufficient width to receive the thickest hack saw blade the holder is intended to accommodate. The slot 6 is disposed generally parallel to the sides of the holder body 5 and is preferably located at one side of the central plane of the body 6, forming a pair of closely spaced jaws 8 and 9.

In accordance with the present invention, novel means is provided for anchoring the saw blade to the body which is effective to rigidly clamp the blade in place while minimizing wear on the holder body itself and permitting convenient replacement of the parts necessarily subject to wear and use. The improved clamping means comprises one or more blade clamping devices 10 rigidly mounted in the jaws 8 and 9 of the body and adapted for securely gripping the saw blade 7. The number of such clamping devices provided is dependent upon the size of the saw blade with which the holder is intended to function, one clamping device being sufficient for small saw blades while two or more may be provided for large blades. Three of the clamping devices are provided in the exemplary holder.

The clamping devices 10 are all alike, each comprising a stationary member 11, herein shown as a generally cylindrical plug or bushing of hardened steel or the like, seated with a press fit in a hole 12 in the jaw 8 with its inner end flush with the inner face of the jaw. The bushing 11 is formed with a cylindrical head 13 at one end and the outer face of the jaw 8 is counterbored to present a shoulder 14 coaxial with the hole 12 for engagement by the screw head. The shoulder 14 thus acts to accurately locate the bushing and to hold it against movement toward the companion jaw while permitting removal from the holder body when required. It will be understood that hack saw blades are commonly provided with one or more holes for attachment to the holder, and the holes 12 for the bushings are therefore spaced apart in accordance with the conventional spacing of such holes.

When assembled with the holder body in the above manner, each of the bushings 11 provides an annular clamping surface flush with the inner face of the jaw 8 which is preferably on the center line of the body. Each bushing 11 is internally threaded for the reception of a cap screw 15 having a head 16 operative to clamp the saw blade 7 firmly against the clamping surface provided by the bushing. It will be observed that the inner face of the jaw 8 serves primarily as a locating surface and wear incident to the repeated clamping of blades in the holder is confined to the bushing 11 which is readily replaceable.

The companion jaw 9 of the holder body is formed with a series of holes 17 alined with the holes 12 and dimensioned to receive the head 16 of the cap screws with a close fit. The screw heads are suitably shaped for coaction with a tool by which they may be screwed into or out of the bushings, the screws illustrated having hexagonal sockets in their heads for the reception of a wrench. The screws may thus be fully inserted in the holes 17 leaving no projections whatever on the outer faces of the holder body.

When a blade is to be mounted in the holder, the screws 15 are removed and the end of the blade is inserted between the jaws 8 and 9 in the usual manner. The cap screws 15 are then screwed into the bushings and turned up tightly to clamp the saw blade between the head 16 of the screw and the annular clamping surface provided by the inner end of the bushing. Due to the close fit of the screw heads 16 in the holes 17 and to the press fit mounting of the bushings 11, the saw blade is rigidly anchored to the body.

As the clamping action is primarily between the heads 16 of the screws 15 and the ends of the bushing 11, wear on the holder body 5 is reduced to a minimum. In the event that the bushings or screws become worn or the threads of these parts are stripped, the individual elements may be quickly and easily replaced at a minimum cost thus avoiding the necessity of scrapping the holder body.

It will be apparent from the foregoing that the invention provides a hack saw blade holder of novel and improved construction which is adapted to hold saw blades of different thickness with the high degree of rigidity required for efficient operation. The clamping devices for anchoring the saw blade to the holder body are set inwardly so that there are no projections from the outer faces of the holder body thus making them safe to use and permitting most efficient mounting of the holders in the hack saw frame. Moreover, by reason of the novel construction of the holder and particularly the blade clamping means, the parts necessarily subject to wear are quickly and easily replaceable at a minimum of expense thus increasing the useful life of the tool body itself.

I claim as my invention:

1. A hack saw blade holder comprising, in combination, a rigid body having a longitudinal slot at one end forming a pair of spaced jaws, said slot being dimensioned to receive one end of a hack saw blade, a clamping device including a member removably mounted on one of said jaws and having one end substantially flush with the inner surface of the jaw forming one wall of the slot, a clamping screw threaded into said member and having a head operative to engage and clamp the saw blade against said one end of the member, the other of said jaws having a hole adapted to receive the screw head with a close fit to provide guiding support for the same, and coacting means on said member and said one jaw defining a limit position for the member whereby the clamped saw blade is effectually held against movement transversely of said slot.

2. A hack saw blade holder comprising, in combination, a rigid body, opposed jaws formed at one end of the body by a longitudinal slot therein, said jaws having alined holes extending therethrough, a generally cylindrical bushing mounted in the hole in one jaw and having a head at one end seating in a counterbore coaxial with the hole, said counterbore defining a shoulder engageable by the head to locate the end of the bushing substantially flush with one wall of said slot, and a headed screw extending through the aligned hole in the other of said jaws and threading into said bushing, the head of said screw engaging and serving to clamp the saw blade against the end of the bushing and having a guiding fit with the walls of said last mentioned hole.

GEORGE J. BLUM.